United States Patent [19]

Betts

[11] Patent Number: 5,050,908
[45] Date of Patent: Sep. 24, 1991

[54] MUD FLAP ANTI-SAIL BRACKET

[76] Inventor: William M. Betts, 27 Sotelo Ave., Piedmont, Calif. 94611

[21] Appl. No.: 542,253

[22] Filed: Jun. 21, 1990

[51] Int. Cl.$^5$ ............................................. F16M 13/00
[52] U.S. Cl. ................................... 280/851; 248/287; 248/302; 280/154
[58] Field of Search ...................... 248/448, 450, 441.1, 248/442.2, 443, 447.1, 201, 287, 276, 295.1, 302, 309.1; 280/847, 851

[56] References Cited

U.S. PATENT DOCUMENTS

| | | | |
|---|---|---|---|
| 1,192,684 | 7/1916 | Rappleye | 248/302 |
| 2,317,867 | 4/1943 | Taylor | 248/448 |
| 3,091,478 | 5/1963 | Ambli | 280/851 |
| 3,244,432 | 4/1966 | Ambli | 280/851 |
| 4,830,196 | 5/1989 | Csanady | 248/302 |

FOREIGN PATENT DOCUMENTS

| | | | |
|---|---|---|---|
| 496078 | 9/1953 | Canada | 280/851 |
| 559791 | 9/1932 | Fed. Rep. of Germany | 248/302 |

*Primary Examiner*—Ramon O. Ramirez
*Assistant Examiner*—Robert A. Olson
*Attorney, Agent, or Firm*—Bruce & McCoy

[57] ABSTRACT

A mud flap anti-sail bracket having depending support rods secured to the upper corners of the mud flap and carrying a cross-member at variable vertical locations therealong.

5 Claims, 2 Drawing Sheets

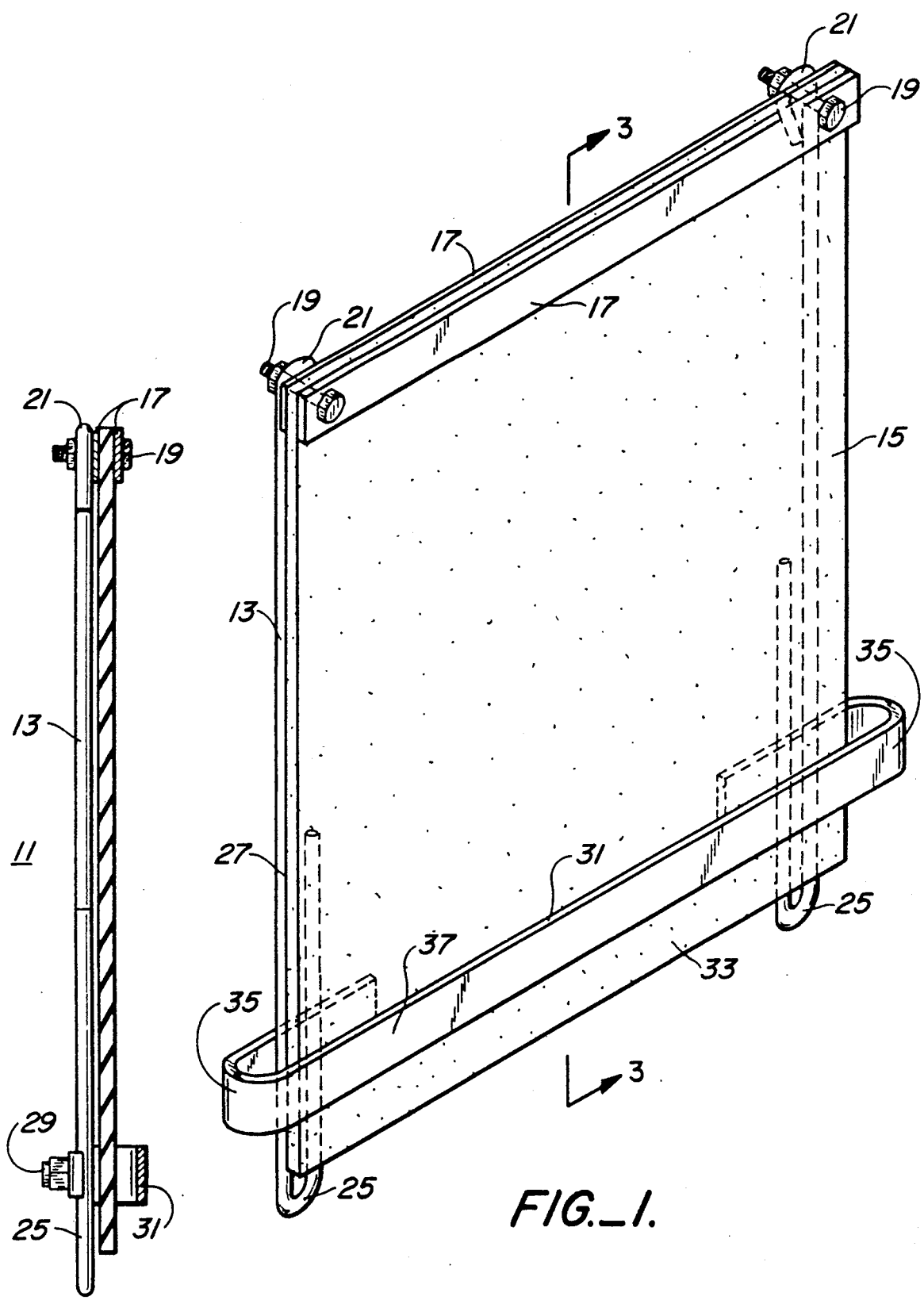

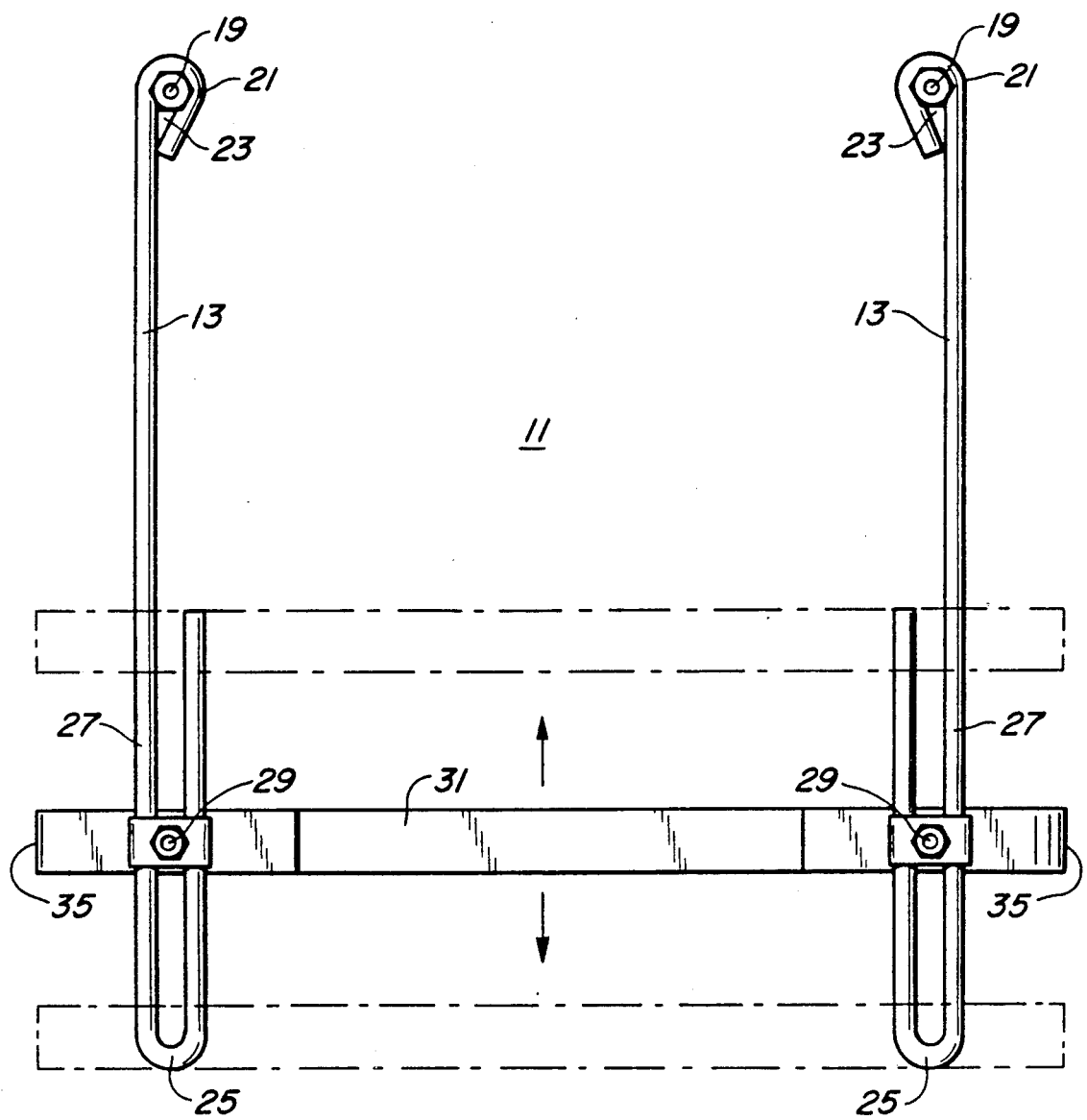
FIG._2.

MUD FLAP ANTI-SAIL BRACKET

BACKGROUND OF THE INVENTION

1. Field of the Invention

The present invention relates to truck mud flap stiffener devices, and more particularly, to a support bracket which prevents a mud flap mounted behind the wheels of a truck or trailer from sailing due to wind and water or mud forces as the vehicle moves down the road.

2. Description of the Prior Art

A major problem for truck drivers and trucking companies, particularly those which must operate in wet weather, is the need to prevent water, mud, and road debris, such as road stones and other solid articles, from being thrown into the front ends and windshields of vehicles which on occasion closely follow truck traffic. This problem has traditionally been handled by means of a mud flap, but this apparatus, in its original form, has been pushed to the limit of its effectiveness by a combination of factors, the most prominent of which is the high speed at which truck traffic now travels.

A mud flap is usually an elongated flexible piece of generally rectangular waterproof material which is disposed in a position behind the wheels or tires of a truck and/or its trailer(s). In its cheapest form, a mud flap is made of rubber, but to resist deterioration caused by road surface oil, a more expensive rubber material such as neoprene can be used which is oil resistant. The mud flap is positioned so as to hang down behind the tires and intercept the water, mud, road stones, and other items which might be thrown off of the truck or trailer tires in a rearward direction. This problem must be attended to by the truck owners as a matter of courtesy, safety, and financial consideration to prevent damage and possibly injury to the vehicles which follow trucks and their occupants. It is probably more likely that this problem is dealt with because it is required by law or because it might result in liability for damages.

The characteristics which result in the best material for a mud flap are those inherent in rubberized sheeting. Such a material can absorb shook and distortion and does not deteriorate by exposure to the natural elements. However, its characteristic of being flexible also permits it to sail out of its effective operating position located behind a tire due to turbulent wind forces from passing traffic, and water and mud spray, and simply as a result of traveling down the road at high speed. One solution obviously is to increase the thickness or stiffness of the material, but this solution causes an increased manufacturing cost and generally a less effective item than is desired.

As a result, a preferred solution which allows proper positioning of the mud flap and yet provides it with the preferred resilience is to support it with a bracket which limits the movement of the mud flap in response to these various forces while permitting the very flexible nature and advantages of the deformable mud flap to be employed or utilized while yet restraining its movement to the preferred location behind the tire.

Generally, the support brackets which have been employed for this purpose are made of welded rod which are of fixed configuration, light weight, and provide, at their lower end, encircling or partially encircling structure for containing the lower end of the mud flap.

The problem with these prior art devices is that they are not adjustable to different sized mud flaps or for supporting the mud flap at variable vertical locations along its length, and they are light weight whereby they do not provide any ballast to the flap, they are generally unattractive, and they are of fixed configuration whereby they cannot be disassembled for packaging in a small container for shipping. The present invention provides numerous advantages over the prior art in that it is highly adaptable to different sized mud flaps, provides a low weighted structure for ballast, has an aesthetically pleasing design, and allows positioning of the mud flap motion restrictor and ballast at variable vertical locations along the bottom end of the mud flap. Very importantly, it is constructed of a multiple of simple pieces which can be disassembled for packaging in the smallest possible container for shipping, and manufactured for the least possible cost.

SUMMARY OF THE INVENTION

The present invention is a mud flap anti-sail support bracket for a truck or trailer mud flap wherein the mud flap is secured to the vehicle by a mounting means disposed along the upper edge thereof. The invention is comprised of a pair of depending spring steel support rods which have their upper ends formed for engaging the front side of the mud flap mounting means proximate the upper opposite ends of the mud flap. The support rods are formed to allow a cross-member to be attached proximate the lower ends thereof at variable vertical locations along the support rods and for permitting the upper ends of the rods to be disposed at variable spacing from each other to fit different width mud flaps. A cross-member is provided which is formed for securement to the depending support rods at the lower ends and for at least partially encircling a mud flap in spaced relation thereto proximate its lower end and for providing ballast thereto.

OBJECTS OF THE INVENTION

It is therefore an important object of the present invention to provide a mud flap anti-sail support bracket which prevents sailing of the mud flap due to wind and water forces and thrown mud as the truck to which the mud flap is attached moves down the road.

It is another object of the present invention to provide a mud flap anti-sail bracket which is adjustable to different sized mud flaps and permits placement of the mud flap motion restrictor at variable vertical locations along the bottom end of the mud flap.

It is a further object of the present invention to provide a mud flap anti-sail bracket in which the motion restrictor is a low weighted structure to provide ballast to the mud flap it supports.

It is yet another object of the present invention to provide a mud flap anti-sail bracket which has an aesthetically pleasing appearance.

And it is still a further object of the present invention to provide a mud flap anti-sail bracket which can be made from a multiple of simply made pieces for economic manufacture and packaged in the smallest possible container for shipping.

Other objects and advantages of the present invention will become apparent when the apparatus of the present invention is considered in conjunction with the accompanying drawings.

DESCRIPTION OF THE DRAWINGS

FIG. 1 is a perspective view of the mud flap anti-sail support bracket of the present invention;

FIG. 2 is a front elevation thereof; and

FIG. 3 is a side elevation thereof taken in cross section along lines 3—3 of FIG. 1.

DESCRIPTION OF THE PREFERRED EMBODIMENT

Reference is made to the drawings for a description of the preferred embodiment of the present invention wherein like reference numbers represent like elements on corresponding views.

FIG. 1 shows the anti-sail support bracket of the present invention which is particularly adapted to a truck mud flap which is secured to a vehicle by a mounting means disposed along the upper edge of the flap and at least partially clamping the mud flap therein. The support bracket is comprised of several integrated elements including a pair of depending spring steel support or extension rods 13 which are formed for engaging the front side of a mud flap 15 by the mounting means at the upper opposite corners thereof. The mounting means secures the mud flap to the vehicle by a pair of clamping bars 17 which secure the mud flap therebetween and are secured to the truck by at least a pair of bolts 19 which penetrate through a portion of the body structure of the vehicle or a mounting bracket projecting therefrom.

The upper ends 21 of the support rods are formed for engaging the front side of the mounting means which secures the mud flap to the vehicle whereby the rods are disposed in front of the mud flap and behind the wheels. In the usual case, the mounting bolts are selected to be long enough to project through eyes 23, which are formed at the top of the support rods, as well as the clamping bars 17 and the vehicle structure or mounting bracket. In its simplest form, the eye shaped upper ends of the support rods are formed by bending the ends of the rods around approximately between 210 and 270 degrees, preferably 225 degrees, until the end of the rod comes back into contact with the rod intermediate its length.

The lower ends of the support rods are formed with a U-shaped lower end 25 by bending the rod through 180 degrees until the free end is disposed adjacent and parallel to the intermediate length 27 or portion of the support rod. The spacing between the U-shaped free end and the intermediate portion of the rod is arranged to permit the shank of a securement bolt 29 to pass between the two portions of the rod which are disposed in parallel relation. This support rod element of the bracket is made by simply making two basic bends in a preselected length of straight rod. The two required support rods are identical which further reduces the need for manufacturing jigs or tools.

A flat bar stock steel cross-member 31 is provided as a spacer which is secured between the lower ends 25 of the support rods. It is formed for at least partially encircling the mud flap 15 in spaced relation thereto proximate to the lower free end thereof 33. In the preferred embodiment, the cross-member is formed from flat bar stock by folding back the free ends into a U-shape 35 at each end of the cross-member. The use of flat bar stock, as opposed to rod or a fabricated sheet metal structure, effects a heavy weighted structure which provides ballast to the bracket 11 at the lower end thereof whereby the bracket can be described as low weighted. That means the bracket is provided with ballast at the lower end thereof.

The folded back ends 35 of the cross-member 31 are formed for securing to the depending support rods 13 at variable vertical locations along the rods by means of bolts 29 which penetrate through the folded-over ends of the cross-member and pass between the U-shape lower ends 25 of the support rods. When the bolts 29 are tightened, the cross-member is secured to the rods. The folded-over ends 35 of the cross-member are spaced from the intermediate portion 37 of the cross-member in parallel relation to provide a spacing which permits the mud flap 15 to be disposed therebetween in partially surrounded spaced relation thereto. The holes for the bolts 29 in the cross-member can be slots to permit variable width spacing of the support rods 13 to accommodate variable widths of mud flap. This cross-member element of the bracket is made by simply stamping slots in the two ends of a preselected length of flat bar stock, polishing it, and bending the two ends the same amount around the same jig.

The cross-member 31 has finished metal surfaces, at least on the top and bottom and externally facing sides of the cross-member to provide a mounting surface for a logo or slogan on the rear externally facing side. In the preferred embodiment, the cross-member is chrome-plated for an aesthetically pleasing appearance.

The mud flap anti-sail brackets of the prior art are welded units requiring the increased cost for the manufacturing expense and the labor required to weld the assembly. This results in the support rods being spaced apart and being secured perpendicularly to the mud flap encircling cross-member. The finished brackets of the prior art occupy considerable volume which must be enclosed in an overly large container for shipping. The present invention does not require assembly expense during manufacture as it is shipped to the retailer disassembled. Since the support rods 13 can be disposed in the shipping package parallel to the cross-member 31, a very minimum of package volume is required thereby reducing container size and shipping expense.

In operation, the spring steel support rods 13 of the bracket of the present invention are able to accommodate bending to permit the mud flap 15 to absorb unexpected forces and also permit the lower end of the mud flap to move within certain limitations within the bracket 11. The heavy metal cross-member 31, which provides a low weighted structure to the bracket, transfers this ballast effect to the mud flap when they come in contact as the mud flap tends to sail out of its hanging position.

Thus, it will be apparent from the foregoing description of the invention, in its preferred form, that it will fulfill all the objects and advantages attributable thereto. While it is illustrated and described in considerable detail herein, the invention is not to be limited to such details as have been set forth except as may been necessitated by the appended claims.

I claim:

1. A mud flap anti-sail bracket for a truck mud flap wherein the mud flap is secured to the vehicle by a mounting means disposed along the upper edge thereof, said bracket comprising a pair of identical depending spring steel support rods having their upper ends formed for engaging the front side of the mud flap mounting means proximate the upper opposite ends or corners of the mud flaps, said support rods being formed to allow a cross-member to be detachably secured proximate to the lower ends thereof at variable vertical locations therealong, and a cross-member formed of flat bar stock having folded back ends which are disposed parallel to the intermediate portion of said cross-member and which are formed for securement to said depending support rods at said lower ends and for at least partially encircling a mud flap in spaced relation thereto proximate its lower ends.

2. The bracket of claim 1 wherein the support rods are formed with eye shaped upper ends to permit the mud flap upper corner securement means to pass therethrough for common engagement to sail truck and U-shaped lower ends to allow cross-member securement means to penetrate therebetween at variable vertical positions along said depending support rods.

3. The bracket of claim 1 wherein the cross-member is secured to the depending support rods by means of bolts which penetrate through the folded-over ends of the cross-member and are formed to engage the support rods at various vertical locations therealong, said cross-member having horizontal slots formed in said folded back ends to permit the securement bolts to pass therethrough for engaging said depending support rods at variable horizontal spacing therebetween, said cross-member providing ballast to the lower end of said anti-sail bracket.

4. The bracket of claim 1 wherein the cross-member has finished metal surfaces on at least the top and bottom and externally facing sides.

5. A mud flap anti-sail bracket for a truck mud flap wherein the mud flap is secured to the vehicle by a mounting means disposed along the upper edge thereof, said bracket comprising a pair of identical depending spring steel support rods formed from preselected lengths of straight rod stock, said support rods having eye shaped upper ends formed for engaging the front side of the mud flap mounting means proximate the upper opposite ends or corners of the mud flap, said eyes formed by bending the upper end of said depending rods around a form until the end of the rod comes into close proximity of the support rod intermediate its length, said depending support rods having U-shaped lower ends formed by bending the lower end of said rod through 180° until the free end thereof is disposed adjacent and parallel to the intermediate length of the support rod, the spacing between the U-shaped free end and the intermediate portion of the rod being arranged to permit the shank of a securement bolt to pass between the two portions of the rod which are disposed in parallel relation, a flat bar stock steel cross-member having folded back ends disposed parallel to the intermediate portion of said cross-member, said cross-member being formed for securement to said depending support rods at variable vertical locations therealong by means of bolts which penetrate through the folded over ends of the cross-member and between the U-shaped lower ends of the support rods and secure the cross-member to the rods, said cross-member having finished metal surfaces at least on top and bottom and externally facing sides and being formed for partially encircling the mud flap in spaced relation thereto proximate its lower end and making said bracket a low weighted or ballasted structure.

* * * * *